(12) United States Patent  
Cheng et al.

(10) Patent No.: US 9,310,653 B2  
(45) Date of Patent: Apr. 12, 2016

(54) DISPLAY PANEL

(71) Applicant: Au Optronics Corporation, Hsinchu (TW)

(72) Inventors: Wei-Cheng Cheng, New Taipei (TW); Mei-Ju Lu, Kaohsiung (TW); Yi-Chi Lee, Taichung (TW); Tien-Lun Ting, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/294,172

(22) Filed: Jun. 3, 2014

(65) Prior Publication Data

US 2015/0055069 A1 Feb. 26, 2015

(30) Foreign Application Priority Data

Aug. 20, 2013 (TW) .............................. 102129871 A

(51) Int. Cl.
*G02F 1/141* (2006.01)
*G02F 1/1343* (2006.01)
*G02F 1/1337* (2006.01)

(52) U.S. Cl.
CPC .... *G02F 1/134363* (2013.01); *G02F 1/133707* (2013.01); *G02F 2001/134372* (2013.01); *G02F 2201/121* (2013.01)

(58) Field of Classification Search
CPC ........ G02F 2001/134372; G02F 2001/134318; G02F 1/133707; G02F 2201/121; G02F 1/134363
USPC ................................................. 349/130, 141
See application file for complete search history.

(56) References Cited

U.S. PATENT DOCUMENTS

| | | | |
|---|---|---|---|
| 7,929,097 B1 | 4/2011 | Choi et al. | |
| 8,068,203 B2 | 11/2011 | Nomura et al. | |
| 2010/0097558 A1* | 4/2010 | Nishimura | ..................... 349/143 |
| 2010/0134707 A1* | 6/2010 | Kim et al. | ......................... 349/37 |
| 2015/0277196 A1* | 10/2015 | Nishimura | ........ G02F 1/134363 349/33 |

FOREIGN PATENT DOCUMENTS

| | | |
|---|---|---|
| CN | 101382713 | 3/2009 |
| CN | 102799034 | 11/2012 |
| TW | 201202792 | 1/2012 |
| TW | 201243460 | 11/2012 |

* cited by examiner

*Primary Examiner* — Nathanael R Briggs  
(74) *Attorney, Agent, or Firm* — Jianq Chyun IP Office

(57) ABSTRACT

A display panel includes a first substrate, plural pixel structures on the first substrate, a second substrate and a display medium between the two substrates. Each of the pixel structures includes a scan line, a data line, an active device, a pixel electrode, a common electrode, an insulating layer and a counter electrode. The active device is electrically connected to the scan line and the data line. The pixel electrode is electrically connected to the active device. The common electrode is electrically insulated from the pixel electrode. The insulating layer is between the pixel electrode and the common electrode. The counter electrode is electrically insulated from the pixel electrode and the common electrode, wherein the counter electrode is disposed symmetrically around the pixel electrode, and the voltage absolute value of the counter electrode is greater than the voltage absolute value of the pixel electrode.

20 Claims, 16 Drawing Sheets

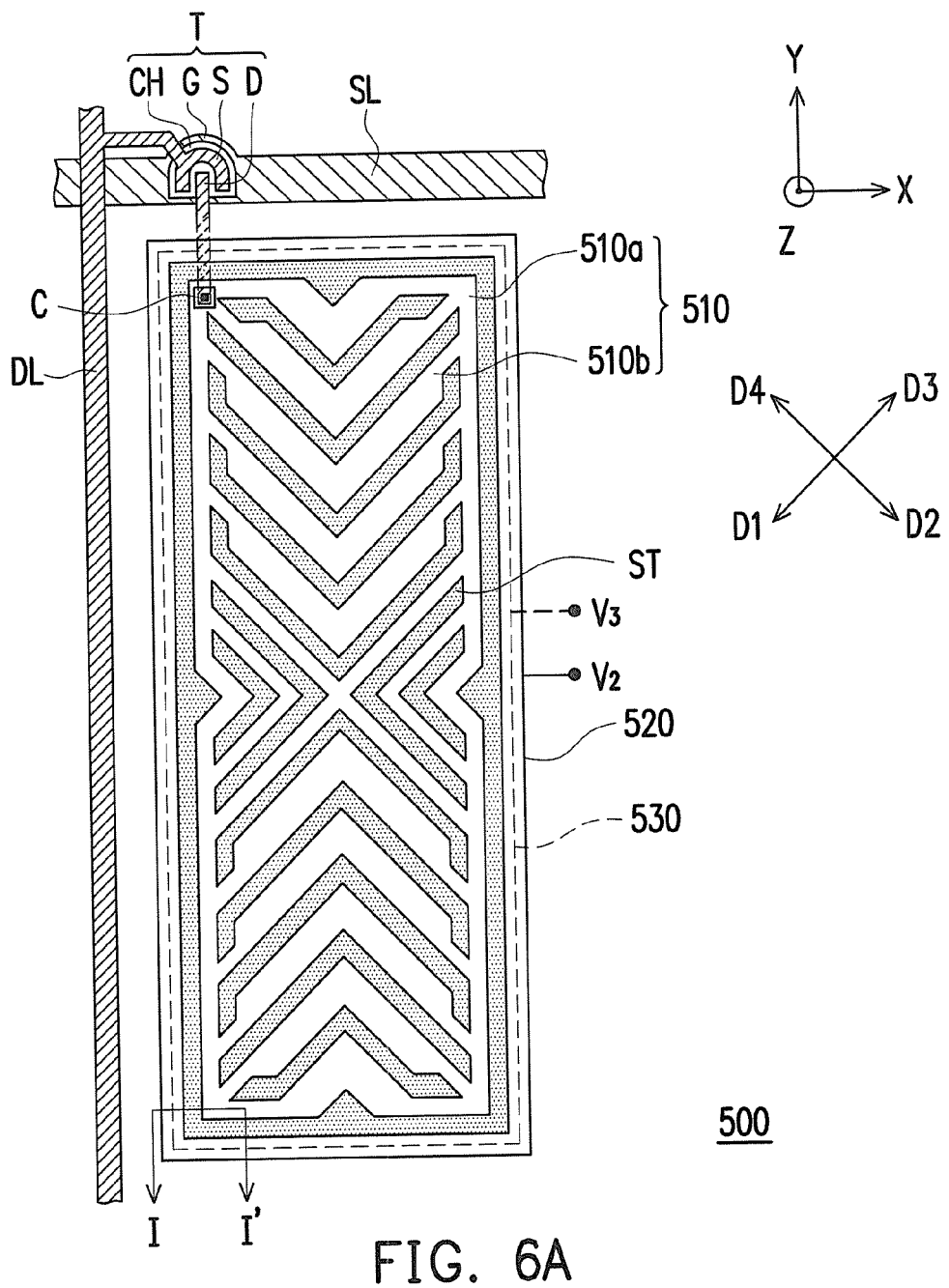
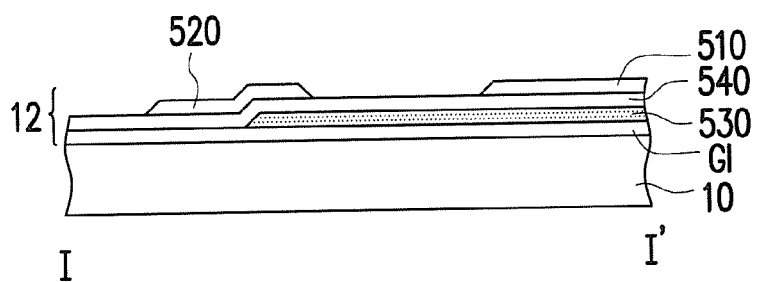
FIG. 6A
FIG. 6B

DISPLAY PANEL

CROSS-REFERENCE TO RELATED APPLICATION

This application claims the priority benefit of Taiwan application serial no. 102129871, filed on Aug. 20, 2013. The entirety of the above-mentioned patent application is hereby incorporated by reference herein and made a part of this specification.

BACKGROUND OF THE INVENTION

1. Field of the Invention

The invention generally relates to a display panel, and more particularly, to a pixel structure of a display panel.

2. Description of Related Art

Along with the display specification of a liquid crystal display (LCD) is constantly developed towards large scale, the LCD performance required from the market is higher and higher towards high contrast, fast response and wide viewing angle. In order to overcome the viewing angle problem brought by the large-size LCD panel, the wide viewing angle technology of an LCD panel must constantly get progress and breakthroughs. The common wide viewing angle technology now includes: twisted nematic (TN) liquid crystal plus wide viewing film, in-plane switching (IPS) LCD panel, fringe field switching (FFS) LCD panel and multi-domain vertical alignment (MVA) LCD panel.

Taking the FFS LCD panel as an example, it features wide viewing angle and low color shift. However, in the prior FFS LCD panel, two major problems exist to be overcome. First, the liquid crystal molecules over the pixel electrode and the liquid crystal molecules over the alignment slit located between the branches of the pixel electrode are subject to different magnitudes and different directions of the electric field, so that the liquid crystal molecules incline inconsistently in terms of the inclination direction to produce unexpected disclinations such as disclination lines or disclination nodes to further affect the transmittance of the LCD panel. In addition, for the vertically aligned negative type liquid crystal in the conventional FFS electrode structure, the multi-domain alignment effect is not significant, so that when the user is viewing in a larger angle of view (AOV), the seen image has white color phenomenon. In view of the above problems, a display panel able to reduce the disclinations and the color washout phenomena for large AOV is provided.

SUMMARY OF THE INVENTION

Accordingly, the invention is directed to a display panel able to reduce the black fringe phenomena and the color washout phenomena for large AOV.

An embodiment of the invention provides a display panel, which includes a first substrate, a plurality of pixel structures located on the first substrate, a second substrate and a display medium located between the first substrate and the second substrate, wherein each of the pixel structures includes a scan line, a data line, an active device, a pixel electrode, a common electrode, an insulating layer and a counter electrode. The active device is electrically connected to the scan line and the data line. The pixel electrode is electrically connected to the active device. The common electrode is electrically insulated from the pixel electrode. The insulating layer is located between the pixel electrode and the common electrode. The counter electrode is electrically insulated from the pixel electrode and the common electrode, wherein the counter electrode is disposed symmetrically around the pixel electrode, and an absolute value of voltage of the counter electrode is greater than an absolute value of voltage of the pixel electrode.

Based on the depiction above, in addition to the pixel electrode and the common electrode, the pixel structure of the display panel in the invention further has a counter electrode. In this way, the display panel unlikely produces the black fringe phenomena and has enhanced multi-domain alignment effect so as to further reduce the color washout phenomena of the display panel under large AOV.

In order to make the features and advantages of the present invention more comprehensible, the present invention is further described in detail in the following with reference to the embodiments and the accompanying drawings.

BRIEF DESCRIPTION OF THE DRAWINGS

FIG. 6A is a top-view diagram of a pixel structure according to the fifth embodiment of the invention.

FIG. 6B is a cross-sectional diagram along line I-I' of FIG. 6A.

FIG. 8A is a top-view diagram of a pixel structure according to the seventh embodiment of the invention.

FIG. 8B is a cross-sectional diagram along line I-I' of FIG. 8A.

DESCRIPTION OF THE EMBODIMENTS

Figure 1:
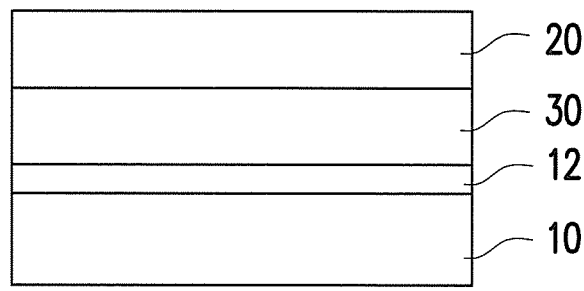
FIG. 1 is a cross-sectional diagram of a display panel according to the invention.
Figure 2A:
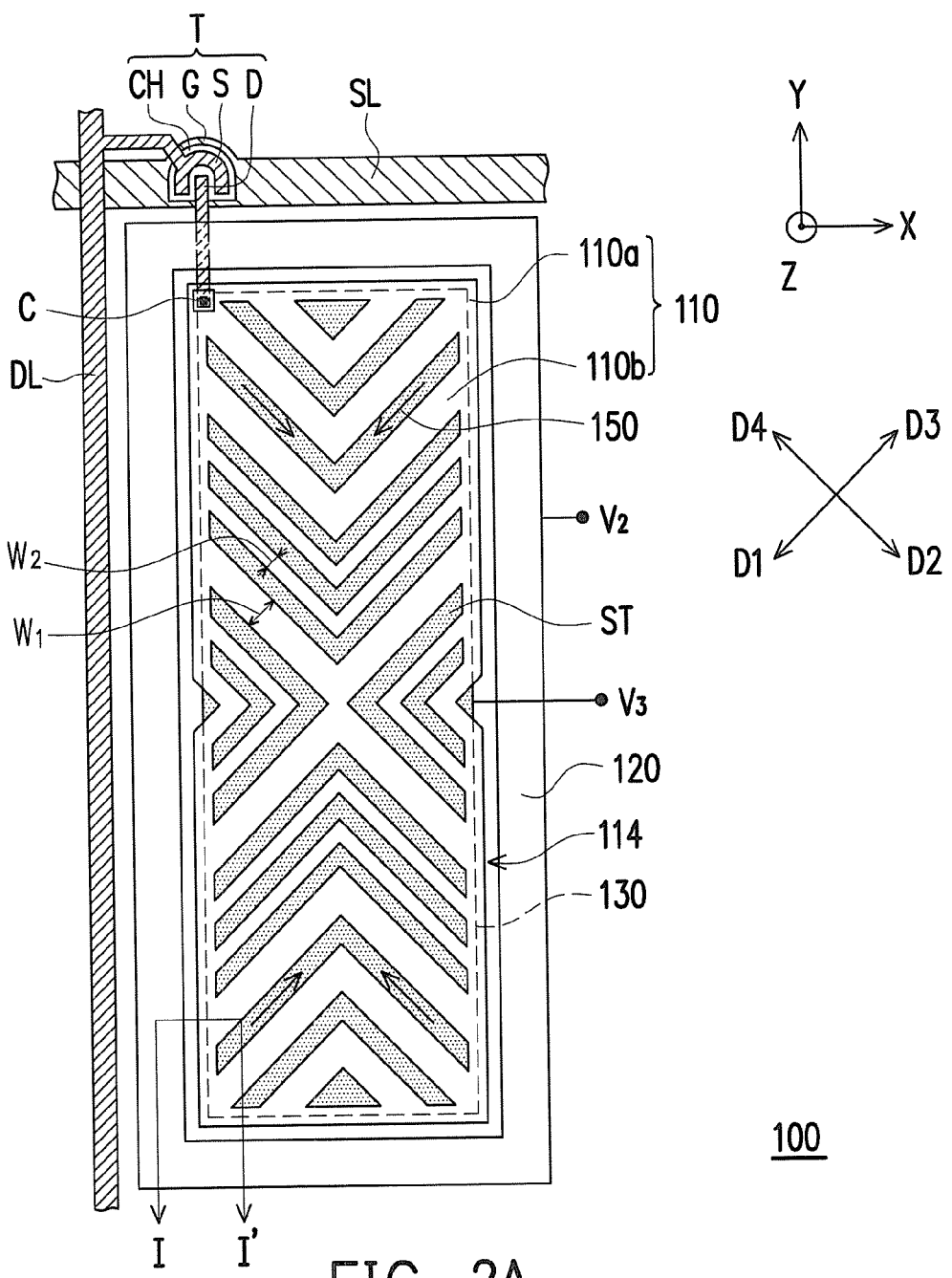
FIG. 2A is a top-view diagram of a pixel structure according to the first embodiment of the invention.
Figure 2B:
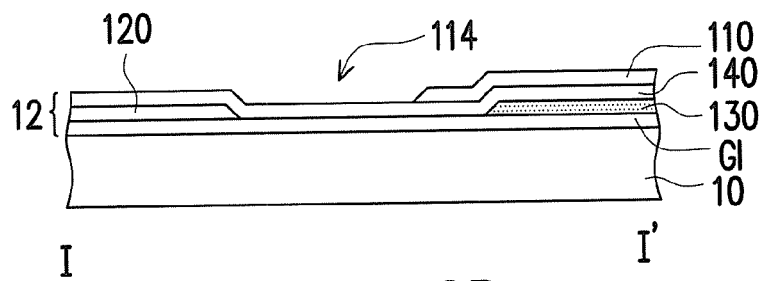
FIG. 2B is a cross-sectional diagram along line I-I' of FIG. 2A.

FIG. 1 is a cross-sectional diagram of a display panel according to the invention, FIG. 2A is a top-view diagram of a pixel structure according to the first embodiment of the invention and FIG. 2B is a cross-sectional diagram along line I-I' of FIG. 2A. In FIG. 1, only partial parts of the display panel 2000 are shown (for simplicity, the scan line SL, the data line DL and the active device T are omitted)

The display panel 2000 of the invention (as shown by FIG. 1) includes a first substrate 10, a second substrate 20, a display medium 30 and a pixel array layer 12. In the invention, the display panel 2000 is, for example, an LCD panel. In the embodiment, the display panel 2000 is, for example, a vertical alignment-fringe field switching (VA-FFS) LCD panel, which has high contrast of the vertical alignment mode and the wide AOV of the fringe field switching mode. In following, the embodiments of the invention, the display panel 2000 takes the VA-FFS LCD panel as an example.

The material of the first substrate 10 can be glass, quartz, organic polymer, metal or similar materials. The pixel array layer 12 is disposed on the first substrate 10 and the pixel array layer 12 is composed of a plurality of pixel structures 100, and the design of the pixel structures 100 refers to FIG. 2A and the details in the following.

The second substrate 20 is opposite to the first substrate 10, and the material of the second substrate 20 can be glass, quartz, organic polymer or similar materials.

The display medium 30 is located between the pixel array layer 12 on the first substrate 10 and the second substrate 20. The display medium 30 includes a plurality of liquid crystal molecules (not shown), and the liquid crystal molecules can be positive or negative-type liquid crystal molecules. Since the dielectric anisotropy Δε of the negative-type liquid crystal molecules is less than 0, and the vertical alignment liquid crystal molecules have high contrast, the negative-type liquid crystal molecules can effectively increase the contrast and the AOV and can suppress the color washout problem. The display medium 30 in the embodiments of the invention is the vertical alignment negative-type liquid crystal, which the invention is not limited to.

The pixel array layer 12 is located on the first substrate 10 and the display medium 30 covers the pixel array layer 12. The pixel array layer 12 is comprised of a plurality of pixel structures 100. For more clearly described the embodiment of the invention, in FIG. 2A, only one of the pixel structures 100 of the pixel array layer 12 in the display panel 2000 is shown. Any people skilled in the art can get understanding that the pixel array layer 12 in FIG. 1 is comprised of pixel structures 100 as shown by FIG. 2A in array form.

The detail of the pixel structure 100 is depicted in the following. The pixel structure 100 of FIG. 2A includes a scan line SL, a data line DL, an active device T, a pixel electrode 110, a counter electrode 120, a common electrode 130, an insulating layer 140 and a gate insulating layer GI.

The extending directions of the scan line SL and the data line DL are not the same, and it is preferable the extending directions of the scan line SL and the data line DL are perpendicular to each other. In addition, the scan line SL and the data line DL are located at different film layers and there is the insulating layer (not shown) therebetween. The scan line SL and the data line DL are configured to mainly deliver the driving signals for the pixel structure 100. The scan line SL and the data line DL are commonly made of metal material, which the invention is not limited to. In other embodiments, the materials of the scan line SL and the data line DL are other conductive materials including alloys, metal oxides, metal nitrides, metal oxynitrides or stacked layers of metal materials and other conductive materials.

The active device T is electrically connected to the scan line SL and the data line DL, in which the active device T is, for example, a thin film transistor (TFT) including a gate G, a channel layer CH, a drain D and a source S. The gate G is electrically connected to the scan line SL, and the source S is electrically connected to the data line DL. In other words, when a control signal is input to the scan line SL, the scan line SL and the gate G are conducted therebetween; when a control signal is input to the data line DL, the data line DL and the source S are conducted therebetween. The channel layer CH is located over the gate G and under the source S and the drain D. The active device T of the embodiment is, for example, a bottom-gate-type TFT, which the invention is not limited to; in other embodiments, the active device T can be a top-gate-type TFT as well.

A gate insulating layer GI (for example, the gate insulating layer GI shown by FIG. 2B) covers the gate G of the active device T. The gate insulating layer GI makes the scan line SL electrically isolated from the data line DL. The material of the gate insulating layer GI, for example, includes inorganic materials, organic materials or combinations of the above-mentioned materials. The inorganic materials are, for example, silicon dioxide (SiO), silicon nitride (SiN), silicon oxynitride (SiON) or stacked layers containing at least two of the above-mentioned kinds of material. The pixel electrode 110 is electrically connected to the active device T. In more details, the pixel electrode 110 is electrically connected to the drain D of the active device T through a contact window C. The material of the pixel electrode 110 is, for example, a transparent conductive layer including metal oxides such as indium-tin-oxide (ITO), indium-zinc-oxide (170), aluminum-tin-oxide (ATO), aluminum-zinc-oxide (AZO), indium-gallium-zinc-oxide (IGZO) or other appropriate oxides or stacked layers containing at least two of the above-mentioned kinds of materials.

In the embodiment, the pixel electrode 110 includes an enclosed box-shaped portion 110a and a plurality of V-shaped branches 110b, which the invention is not limited to. The pixel electrode 110 can also be a pixel electrode (not shown) with a pattern like the Union Jack flag (i.e., UK flag) or a pixel electrode with other patterns. In the embodiment, as shown by FIG. 2A, the tips of the V-shaped branches 110b are arranged opposite to each other in an X direction and in a Y direction. The ends of the V-shaped branches 110b are connected to the enclosed box-shaped portion 110a but not protruded from the enclosed box-shaped portion 110a. In the embodiment, the enclosed box-shaped portion 110a has a pair of sunken outer edges symmetrically disposed on the X-direction, which the invention is not limited to. The two adjacent V-shaped branches 110b disposed opposite to each other are connected to each other to form a cross pattern. In the embodiment, the widths of the V-shaped branches 110b can be different from each other, for example, the width $W_1$ is greater than the width $W_2$. In addition, there is a V-shaped alignment slit ST between the two adjacent V-shaped branches 110b, and all the V-shaped alignment slits ST are respectively arranged opposite to each other in the X direction and in the T direction by means of the tips thereof. Specifically in the invention, since the pixel electrode 110 has the V-shaped branches 110b and the V-shaped alignment slits ST, so that the pixel electrode 110 can be divided into four alignment regions and the liquid crystal molecules in the display medium 30 respectively incline along the directions D1-D4.

The counter electrode 120 is electrically insulated from the pixel electrode 110, and as shown in FIG. 2A, the counter electrode 120 is symmetrically disposed around the pixel electrode 110. In the embodiment, the counter electrode 120 is a patterned electrode with a rectangular frame on the XY plane, which the invention is not limited to. The material of the counter electrode 120 includes metal oxides such as indium-tin-oxide (ITO), indium-zinc-oxide (IZO), aluminum-tin-xide (ATO), aluminum-zinc-oxide (AZO), indium-allium-zinc-oxide (IGZO) or other appropriate oxides or stacked layers containing at least two of the above-mentioned kinds of materials.

The common electrode 130 is electrically insulated from the pixel electrode 110 and the common electrode 130 is electrically insulated from the counter electrode 120. In more details, the insulating layer 140 is disposed between the common electrode 130 and the pixel electrode 110. In the embodiment as shown in FIG. 2A, the common electrode 130 is covered by the pixel electrode 110, which the invention is not limited to. The material of the common electrode 130 includes metal oxides such as indium-tin-oxide (ITO), indium-zinc-oxide (IZO), aluminum-tin-xide (ATO), aluminum-zinc-oxide (AZO), indium-allium-zinc-oxide (IGZO) or other appropriate oxides or stacked layers containing at least two of the above-mentioned kinds of materials.

The material of the insulating layer 140 includes, for example, inorganic materials, organic materials or combinations of the above-mentioned materials. The inorganic materials are such as silicon dioxide (SiO), silicon nitride (SiN), silicon oxynitride (SiON) or stacked layers containing at least two of the above-mentioned materials.

In the embodiment as shown in FIG. 2B, the counter electrode 120 and the common electrode 130 are located at a same film layer, and the insulating layer 140 is disposed between the pixel electrode 110 and the above-mentioned film layer. In more details, there is a gap 114 between the counter electrode 120 and the pixel electrode 110, and the common electrode 130 does not extend into the gap 114. In the invention, the film layer in the pixel structure 100 where the counter electrode 120 is located at is not specifically defined. In the following, accompanying with the figures, the relative layout between the pixel electrode 110, the counter electrode 120 and the common electrode 130 is more described.

In addition, when driving the pixel structure 100, the absolute value of the voltage $V_2$ of the counter electrode 120 is greater than the absolute value of the voltage $V_1$ of the pixel electrode 110. In the embodiment, the difference between the phase of the counter electrode 120 and the phase of the pixel electrode 110 is 0° (the same phase); but the phase difference can be 180° (reverse phase) as well, wherein the important is the voltage difference between the counter electrode 120 and the pixel electrode 110 is fixed. When the pixel structure 100 is not applied by the driving voltage, the liquid crystal molecules are arranged in vertical alignment (that is the Z direction in FIG. 2A); when the pixel structure 100 is applied by the driving voltage, since the absolute value of the voltage $V_2$ of the counter electrode 120 is greater than the absolute value of the voltage $V_1$ of the pixel electrode 110, the liquid crystal molecules would sequentially incline towards the center of the pixel structure 100 from the place closest to the counter electrode 120 up (i.e., from the enclosed box-shaped portion 110a of the pixel electrode 110 up), as shown by the inclination direction 150 of the liquid crystal molecules in FIG. 2A.

More specifically, since the pixel structure 100 of the invention has three kinds of electrodes, the pixel electrode 110, the counter electrode 120 and the common electrode 130, and the absolute value of the voltage $V_2$ of the counter electrode is greater than the absolute value of the voltage $V_1$ of the pixel electrode, so that in the invention, the inclination of the liquid crystal molecules has three features: first, the liquid crystal molecules incline respectively along multiple directions D1-D4 on the XY plane; next, in each of the alignment regions, the liquid crystal molecules over the V-shaped branches 110b and the liquid crystal molecules over the V-shaped alignment slits ST have the same inclination direction; finally, the liquid crystal molecules would sequentially incline towards the center of the pixel structure 100 (i.e., sequentially inclined along the inclination direction 150 of the liquid crystal molecules shown in FIG. 2A) from the place closest to the counter electrode 120 up (i.e., from the enclosed box-shaped portion 110a of the pixel electrode 110 up). In short, the display panel 2000 of the invention not only has enhanced multi-domain alignment effect, but also unlikely produces the black fringe phenomena and the color washout phenomena under large AOV.

Figure 3A:
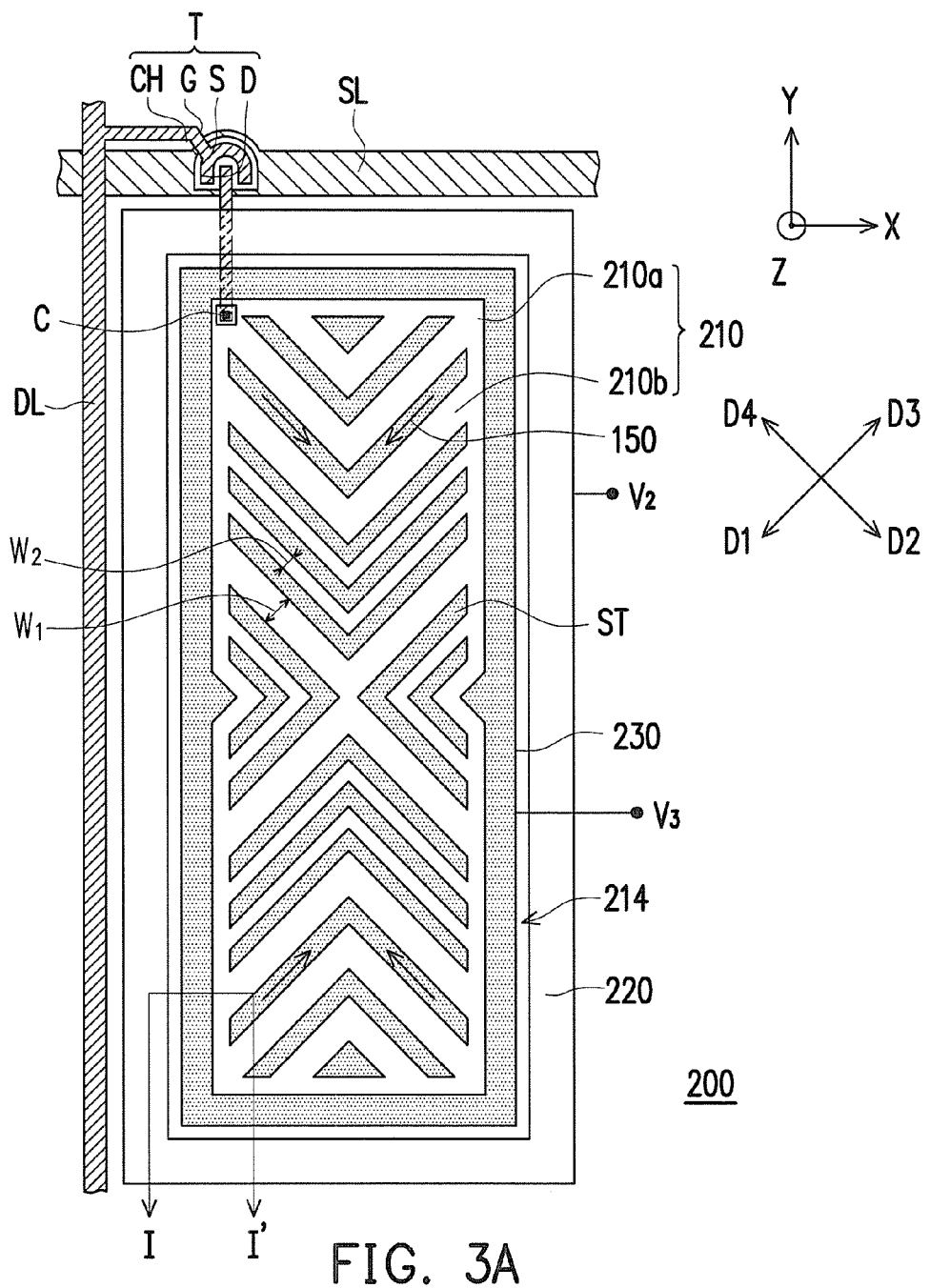
FIG. 3A is a top-view diagram of a pixel structure according to the second embodiment of the invention.
Figure 3B:
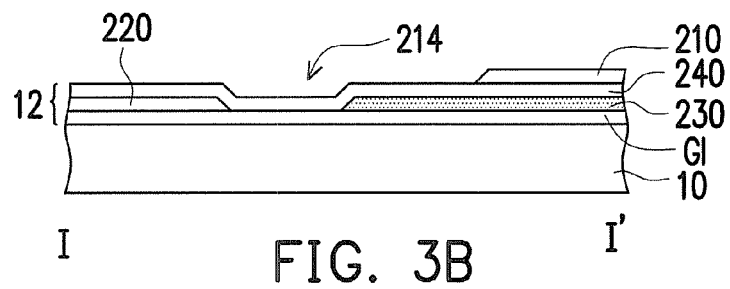
FIG. 3B is a cross-sectional diagram along line I-I' of FIG. 3A.

The relative layout of the pixel electrode 110, the counter electrode 120 and the common electrode 130 in the embodiment is shown by FIGS. 2A and 2B, which the invention is not limited to. In the following, accompanying with several embodiments, many variations of the pixel electrode, the counter electrode and the common electrode are described FIG. 3A is a top-view diagram of a pixel structure according to the second embodiment of the invention and FIG. 3B is a cross-sectional diagram along line I-I' of FIG. 3A. The embodiment of FIGS. 3A and 3B is similar to the first embodiment of FIGS. 2A and 2B, and the same notations represent the same or similar components are adopted, while the repeated same details are omitted, which can refer to the previous embodiment. As shown by FIG. 3A, a pixel electrode 210 includes an enclosed box-shaped portion 210a and a plurality of V-shaped branches 210b. The pixel electrode 210 is similar to the pixel electrode 110 so as to be omitted. In addition as shown by FIG. 3B, the counter electrode 220 and the common electrode 230 are located at a same film layer, and the insulating layer 240 is disposed between the pixel electrode 210 and the film layer. The difference of the embodiment from the first embodiment rests in that the common electrode 230 extends into the gap 214 between the counter electrode 220 and the pixel electrode 210.

Figure 4A:
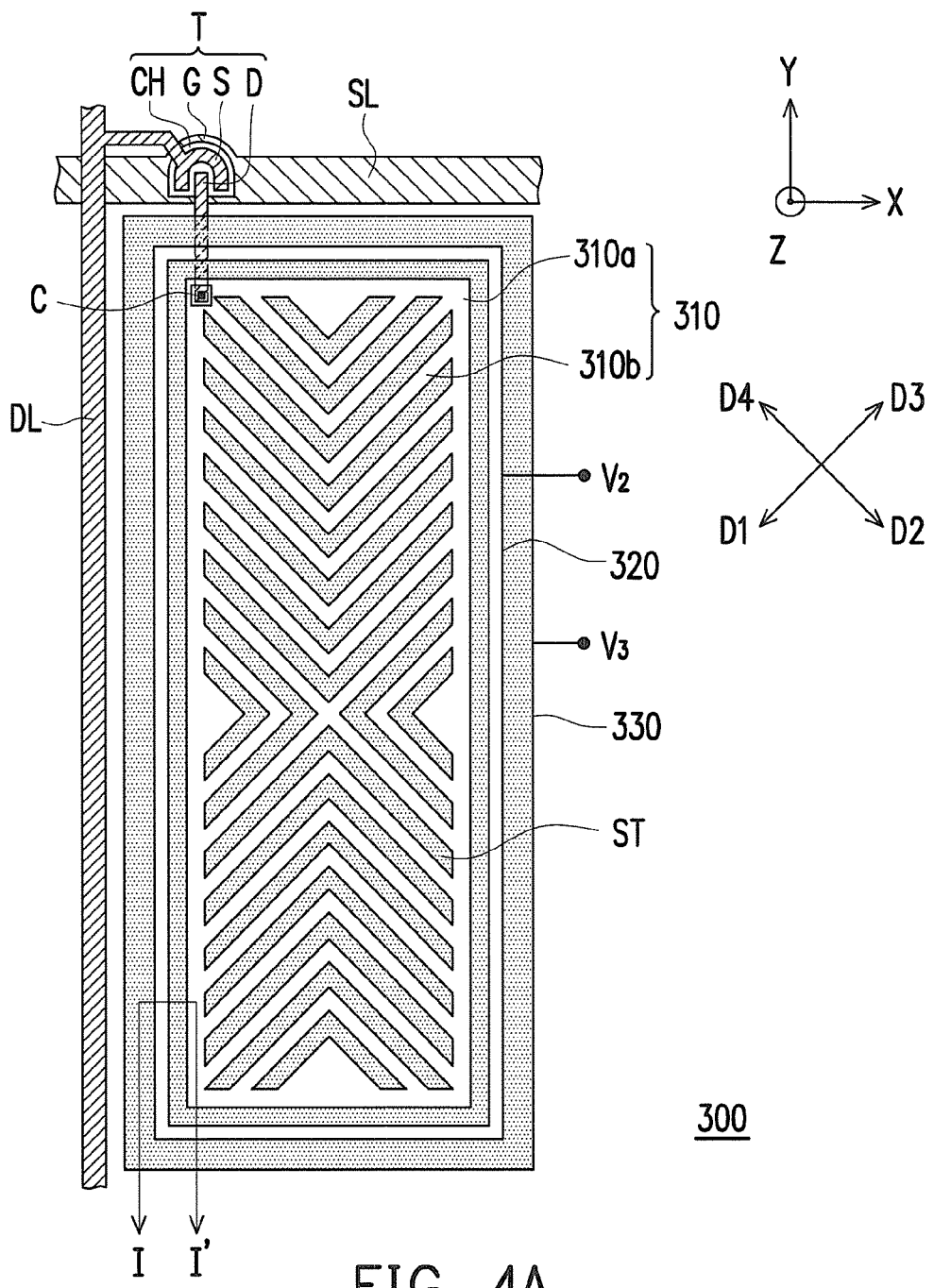
FIG. 4A is a top-view diagram of a pixel structure according to the third embodiment of the invention.
Figure 4B:
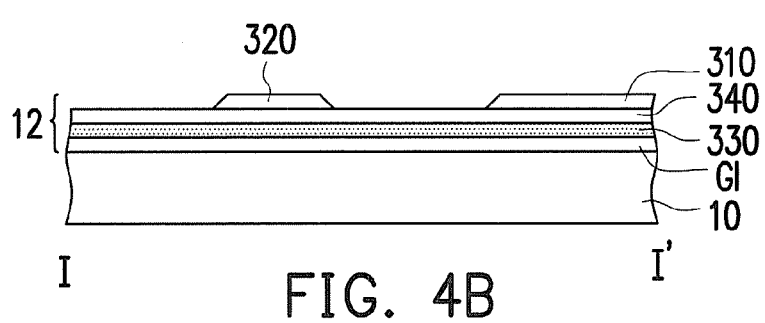
FIG. 4B is a cross-sectional diagram along line I-I' of FIG. 4A.

FIG. 4A is a top-view diagram of a pixel structure according to the third embodiment of the invention and FIG. 4B is a cross-sectional diagram along line I-I' of FIG. 4A. The embodiment of FIGS. 4A and 4B is similar to the first embodiment of FIGS. 2A and 2B, and the same notations represent the same or similar components are adopted, while the repeated same details are omitted, which can refer to the previous embodiment. In the third embodiment of the invention as shown by FIG. 4A, the enclosed box-shaped portion 310a of the pixel electrode 310 has flat outer edges, and the widths of a plurality of V-shaped branches 310b thereof are the same as each other. In the embodiment as shown by FIG. 4B, the pixel electrode 310 and the counter electrode 320 are located at a same film layer, and the insulating layer 340 is disposed between the common electrode 330 and the film layer. In more details, in the embodiment, the counter electrode 320 has ring shape and surrounds the pixel electrode 310. In addition, the distribution region of the common electrode 330 is greater than the distribution regions of the pixel electrode 310 and the counter electrode 320, i.e., the pixel electrode 310 is overlapped with the common electrode 330 and the counter electrode 320 is overlapped with the common electrode 330.

Figure 5A:
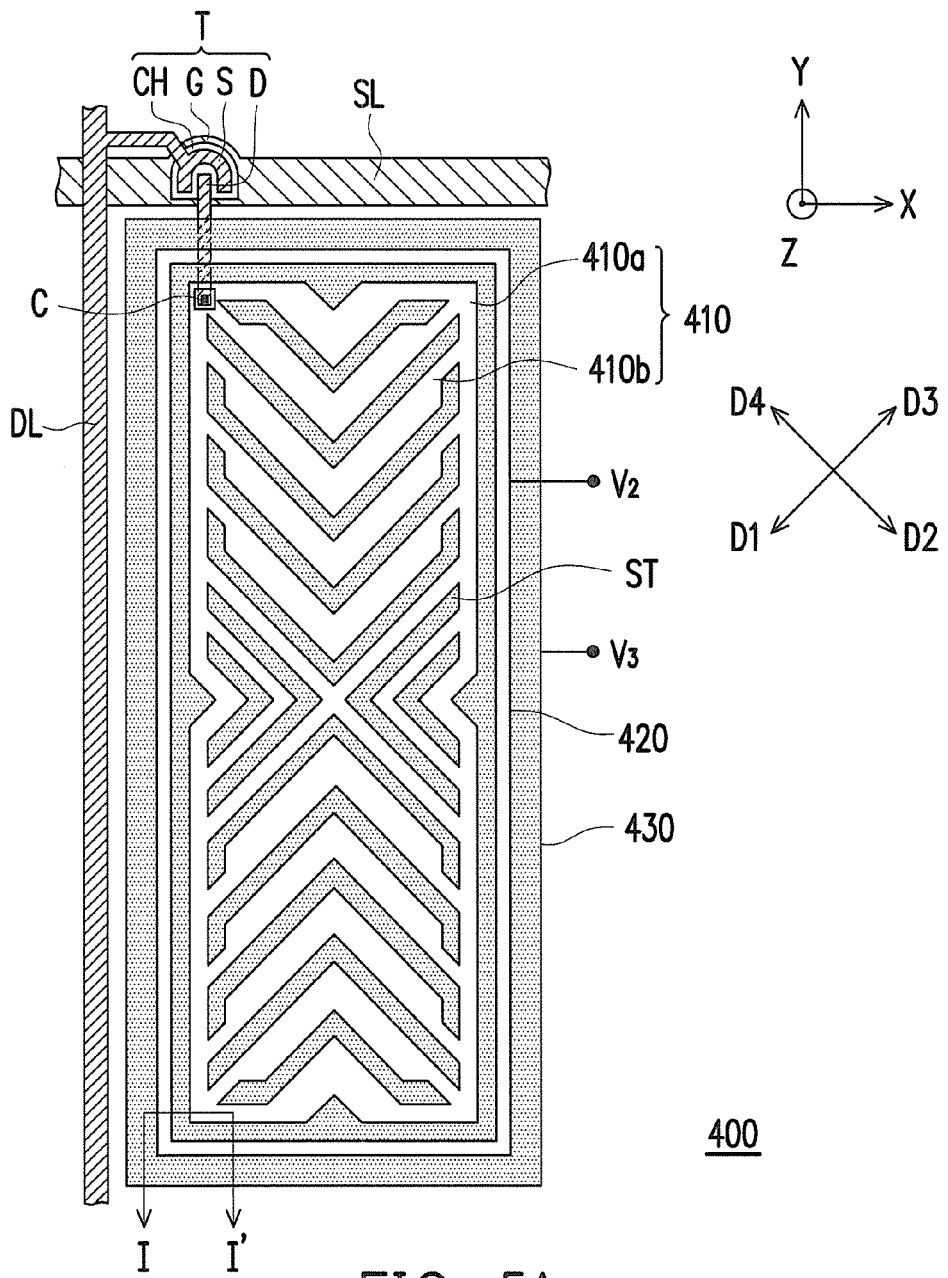
FIG. 5A is a top-view diagram of a pixel structure according to the fourth embodiment of the invention.
Figure 5B:
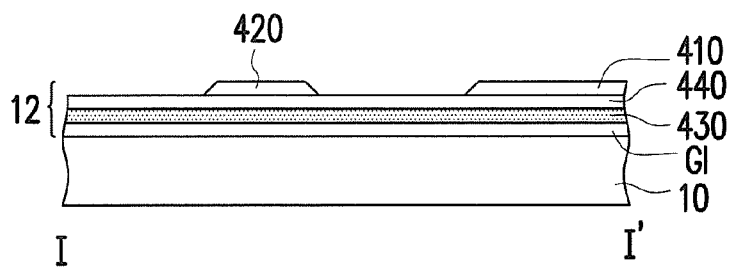
FIG. 5B is a cross-sectional diagram along line I-I' of FIG. 5A.

FIG. 5A is a top-view diagram of a pixel structure according to the fourth embodiment of the invention and FIG. 5B is a cross-sectional diagram along line I-I' of FIG. 5A. The embodiment of FIGS. 5A and 5B is similar to the first embodiment of FIGS. 2A and 2B, and the same notations represent the same or similar components are adopted, while the repeated same details are omitted, which can refer to the previous embodiment. In the embodiment, the relative layout of the pixel electrode 410, the counter electrode 420 and the common electrode 430 is the same as the layout of FIG. 4B, and it is omitted to describe. The difference of the embodiment from the third embodiment rests in that the pattern of the pixel electrode 410. As shown by FIG. 5A, the enclosed box-shaped portion 410a of the pixel electrode 410 has two pairs of sunken outer edges disposed symmetrically on the X direction and on the Y direction. The V-shaped branches 410b form a cross pattern and have a plurality of sunken outer edges in the X direction. The pixel electrode 410 is composed of a plurality of V-shaped branches 410b with the widths same as each other, and the widths of the ends of the V-shaped branches 410b are less than the widths of the tips thereof.

FIG. 6A is a top-view diagram of a pixel structure according to the fifth embodiment of the invention and FIG. 6B is a cross-sectional diagram along line I-I' of FIG. 6A. The embodiment of FIGS. 6A and 6B is similar to the first embodiment of FIGS. 2A and 2B, and the same notations represent the same or similar components are adopted, while the repeated same details are omitted, which can refer to the previous embodiment. As shown by FIG. 6A, a pixel electrode 510 includes an enclosed box-shaped portion 510a and a plurality of V-shaped branches 510b. The pixel electrode 510 is similar to the pixel electrode 410 so as to be omitted. In addition as shown by FIG. 6B, the pixel electrode 510 and the counter electrode 520 are located at a same film layer, and the insulating layer 540 is disposed between the common electrode 530 and the film layer. The difference of the embodiment from the fourth embodiment rests in that the distribution region of the common electrode 530 is less than the distribution regions of the counter electrode 520, which the invention is not limited to. The distribution region of the common electrode 530 can be the same as the distribution regions of the counter electrode 520. In other words, the pixel electrode 510 is overlapped with the common electrode 530, and the counter electrode 520 is not overlapped with the pixel electrode 510 but is overlapped with the common electrode 530.

Figure 7A:
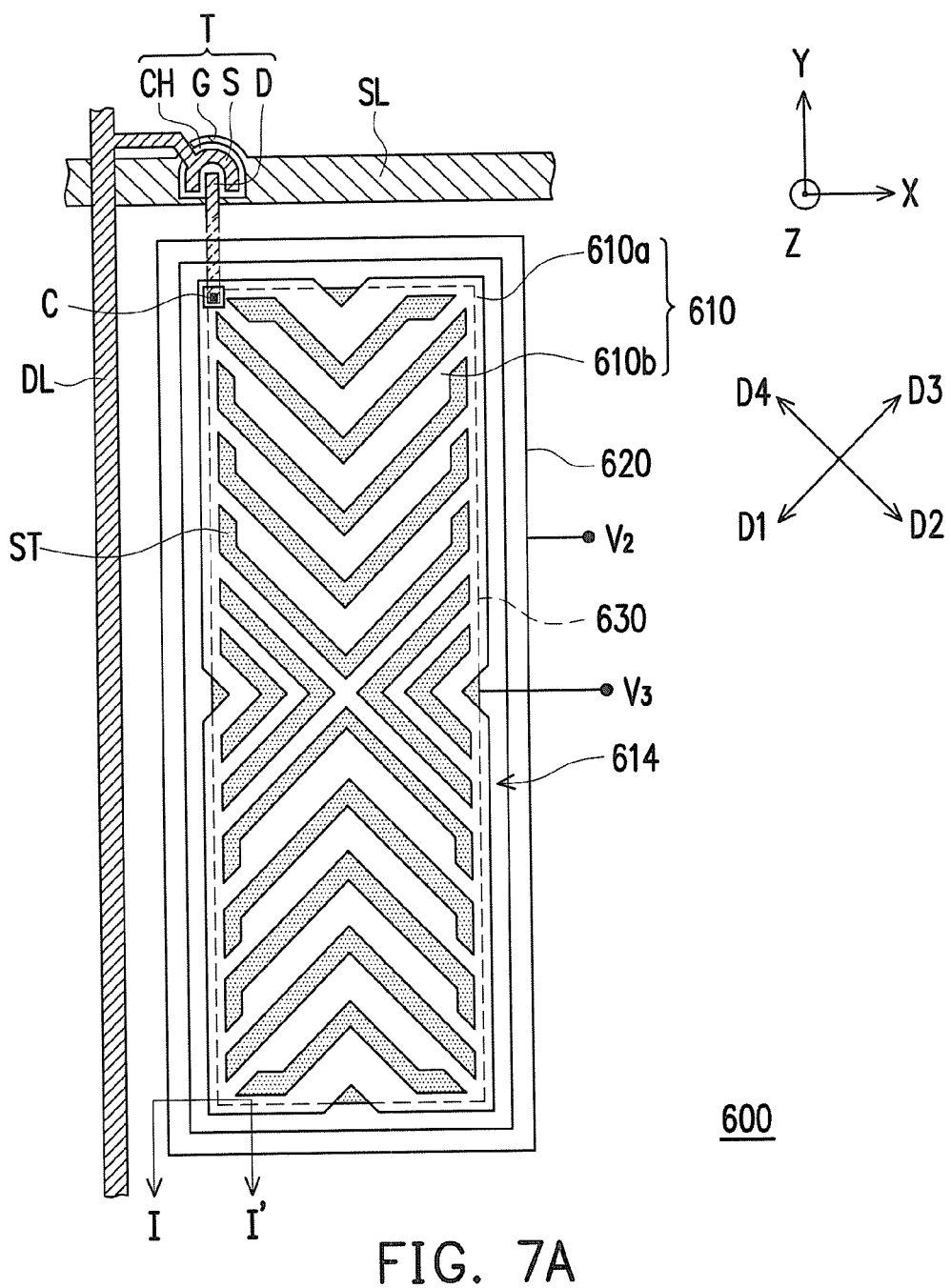
FIG. 7A is a top-view diagram of a pixel structure according to the sixth embodiment of the invention.
Figure 7B:
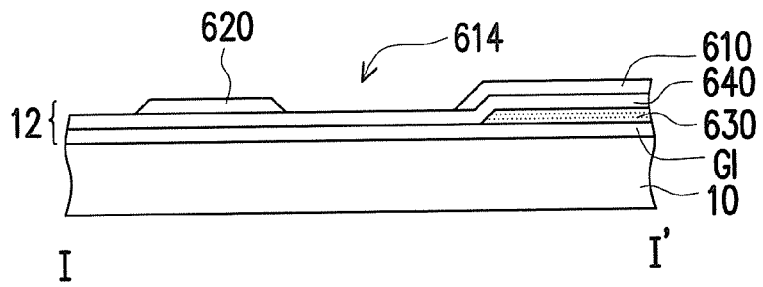
FIG. 7B is a cross-sectional diagram along line I-I' of FIG. 7A.

FIG. 7A is a top-view diagram of a pixel structure according to the sixth embodiment of the invention and FIG. 7B is a cross-sectional diagram along line I-I' of FIG. 7A. The embodiment of FIGS. 7A and 7B is similar to the first embodiment of FIGS. 2A and 2B, and the same notations represent the same or similar components are adopted, while the repeated same details are omitted, which can refer to the previous embodiment. As shown by FIG. 7A, a pixel electrode 610 includes an enclosed box-shaped portion 610a and a plurality of V-shaped branches 610b. The pixel electrode 610 is similar to the pixel electrode 410 so as to be omitted. In addition as shown by FIG. 7B, the pixel electrode 610 and the counter electrode 620 are located at a same film layer, and the insulating layer 640 is disposed between the common electrode 630 and the film layer. The difference of the embodiment from the fifth embodiment rests in that there is a gap 614 between the counter electrode 620 and the pixel electrode 610, and the common electrode 630 does not extend into the gap 614.

Figures 8A, 8B:
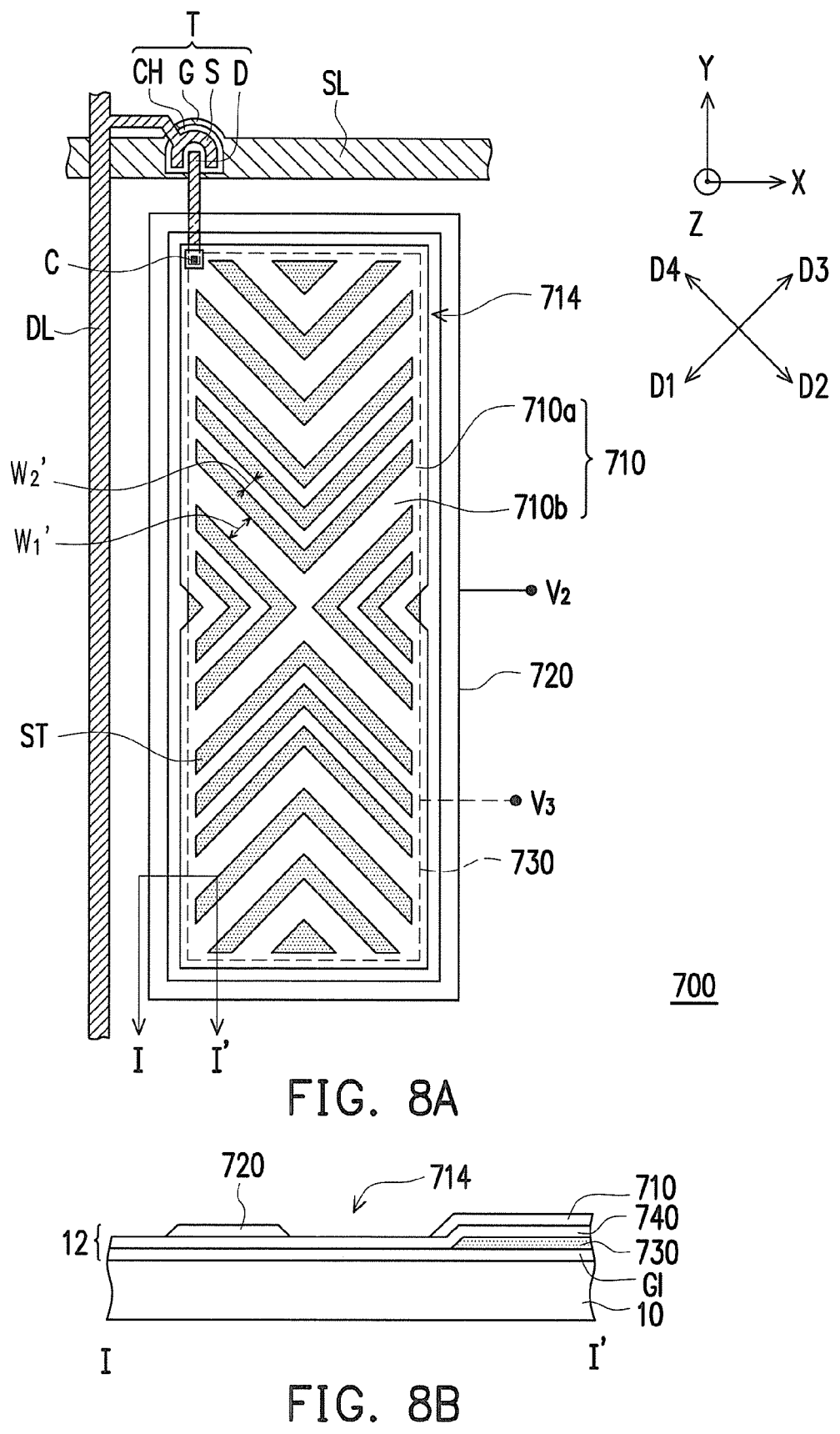

FIG. 8A is a top-view diagram of a pixel structure according to the seventh embodiment of the invention and FIG. 8B is a cross-sectional diagram along line I-I' of FIG. 8A. The embodiment of FIGS. 8A and 8B is similar to the first embodiment of FIGS. 2A and 2B, and the same notations represent the same or similar components are adopted, while the repeated same details are omitted, which can refer to the previous embodiment. As shown by FIGS. 8A and 8B, the counter electrode 720 and the pixel electrode 710 are located at a same film layer, and the insulating layer 740 is disposed between the common electrode 730 and the film layer. Similarly, the pixel electrode 710 is overlapped with the common electrode 730, and the counter electrode 720 is not overlapped with the pixel electrode 710 and is not overlapped with the common electrode 730. The difference of the embodiment from the sixth embodiment rests in the pattern of the pixel electrode 710. In the embodiment, the enclosed box-shaped portion 710a of the pixel electrode 710 has one pair of sunken outer edges disposed symmetrically on the X direction. The widths of the V-shaped branches 710b are different from each other, for example, the width $W_1'$ thereof is greater than the $width_2'$.

Figure 9A:
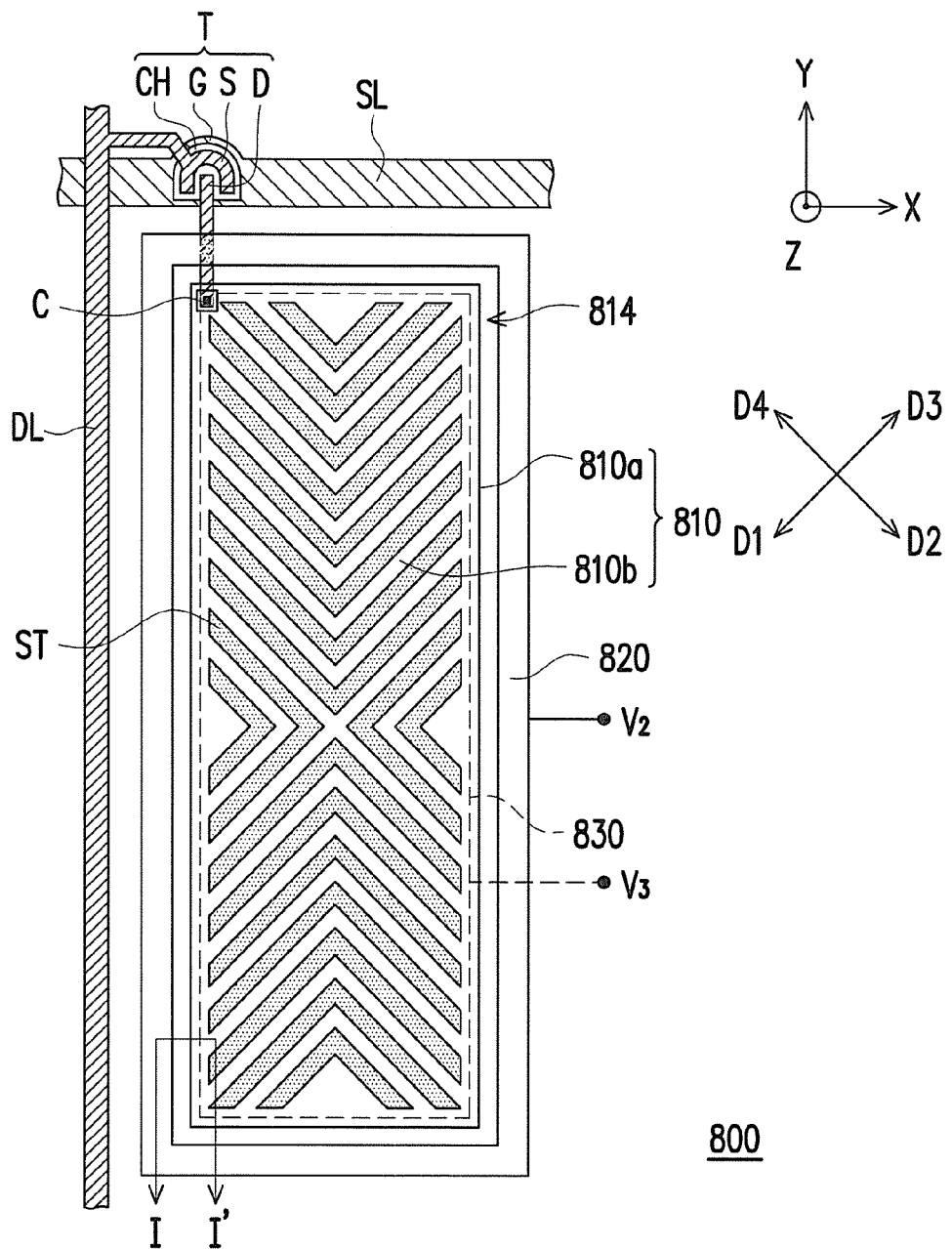
FIG. 9A is a top-view diagram of a pixel structure according to the eighth embodiment of the invention.
Figure 9B:
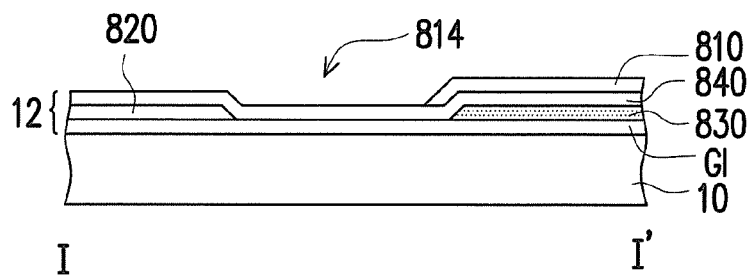
FIG. 9B is a cross-sectional diagram along line I-I' of FIG. 9A.

FIG. 9A is a top-view diagram of a pixel structure according to the eighth embodiment of the invention and FIG. 9B is a cross-sectional diagram along line I-I' of FIG. 9A. The embodiment of FIGS. 9A and 9B is similar to the first embodiment of FIGS. 2A and 2B, and the same notations represent the same or similar components are adopted, while the repeated same details are omitted, which can refer to the previous embodiment. As shown by FIG. 9A, in the eighth embodiment of the invention, the enclosed box-shaped portion 810a has flat outer edges, and the widths of a plurality of V-shaped branches 810b are the same as each other. In the embodiment as shown by FIG. 9B, the counter electrode 820 and the common electrode 830 are located at a same film layer, and the insulating layer 840 is disposed between the pixel electrode 810 and the film layer. In the embodiment, the counter electrode 820 has ring shape and surrounds the pixel electrode 810. In addition, the distribution region of the common electrode 830 is less than the distribution regions of the pixel electrode 810, which the invention is not limited to. In fact, the distribution region of the common electrode 830 can be equal to the distribution regions of the pixel electrode 810. In other words, the pixel electrode 810 is overlapped with the common electrode 830 and the counter electrode 820 is not overlapped with the pixel electrode 810 and is not overlapped with the common electrode 830. Moreover, there is a gap 814 between the counter electrode 820 and the pixel electrode 810 and the common electrode 830 does not extend into the gap 814.

Figure 10A:
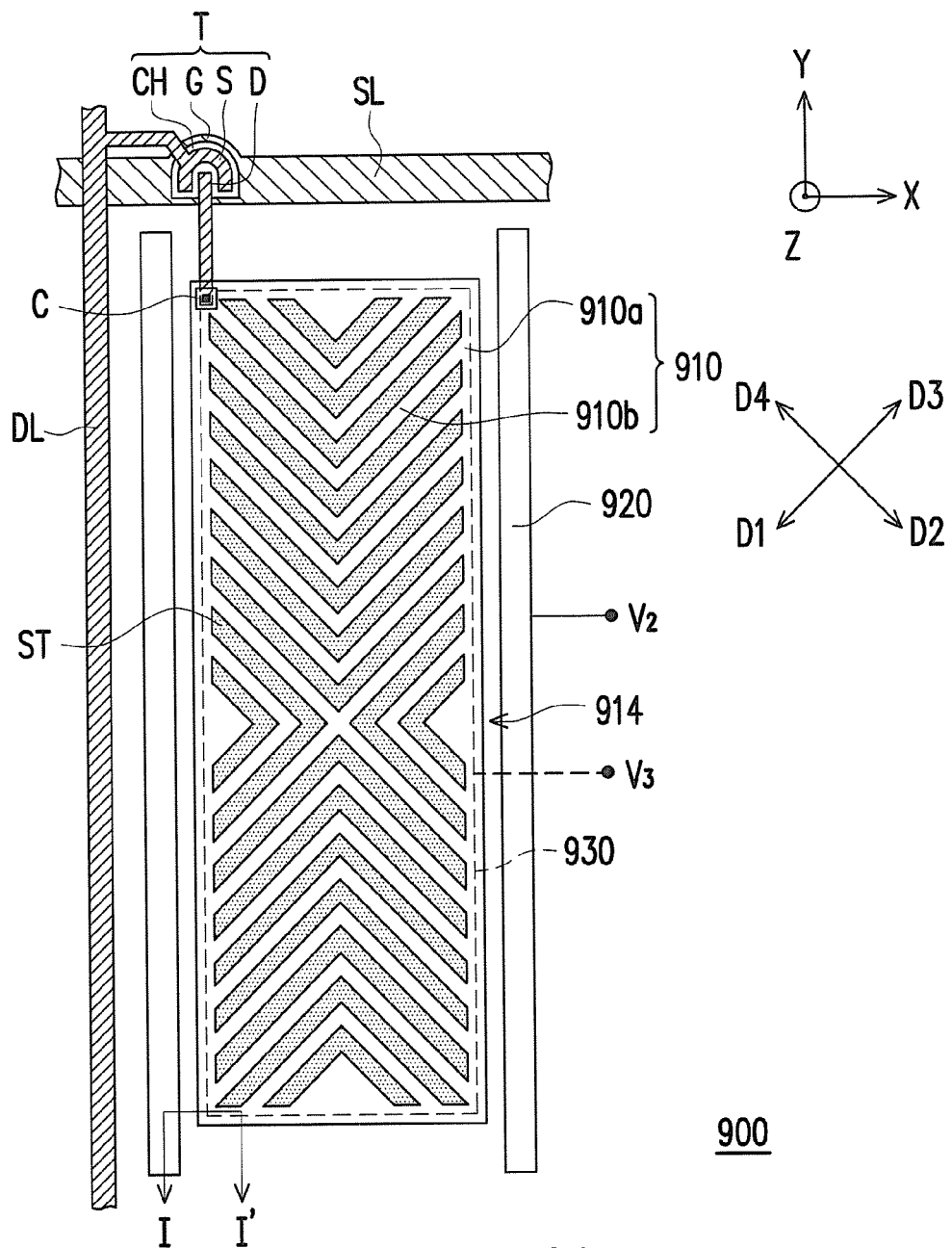
FIG. 10A is a top-view diagram of a pixel structure according to the ninth embodiment of the invention.
Figure 10B:
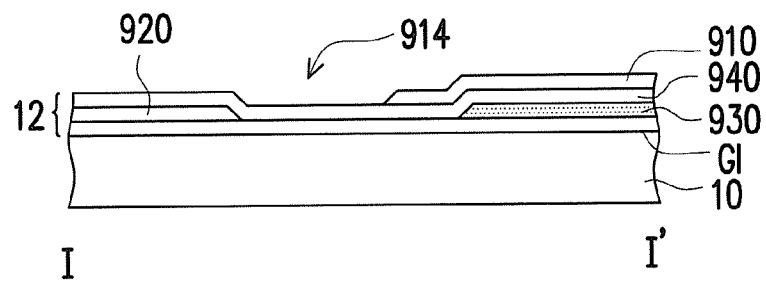
FIG. 10B is a cross-sectional diagram along line I-I' of FIG. 10A.

FIG. 10A is a top-view diagram of a pixel structure according to the ninth embodiment of the invention, and FIG. 10B is a cross-sectional diagram along line I-I' of FIG. 10A. The embodiment of FIGS. 10A and 10B is similar to the first embodiment of FIGS. 2A and 2B, and the same notations represent the same or similar components are adopted, while the repeated same details are omitted, which can refer to the previous embodiment. In the embodiment as shown by FIG. 10A, the enclosed box-shaped portion 910a has flat outer edges and the widths of a plurality of V-shaped branches 910b are the same as each other. In the embodiment, as shown by FIG. 10B, the counter electrode 920 and the common electrode 930 are located at a same film layer, and the insulating layer 940 is disposed between the pixel electrode 910 and the film layer. In the embodiment, the counter electrode 920 has bar shape and is disposed at both sides of the pixel electrode 910. In addition, the distribution region of the common electrode 930 is less than the distribution regions of the pixel electrode 910, which the invention is not limited to. In fact, the distribution region of the common electrode 930 can be equal to the distribution regions of the pixel electrode 910. In other words, the pixel electrode 910 is overlapped with the common electrode 930 and the counter electrode 920 is not overlapped with the pixel electrode 910 and is not overlapped with the common electrode 930. Moreover, there is a gap 914 between the counter electrode 920 and the pixel electrode 910 and the common electrode 930 does not extend into the gap 914.

Figure 11A:
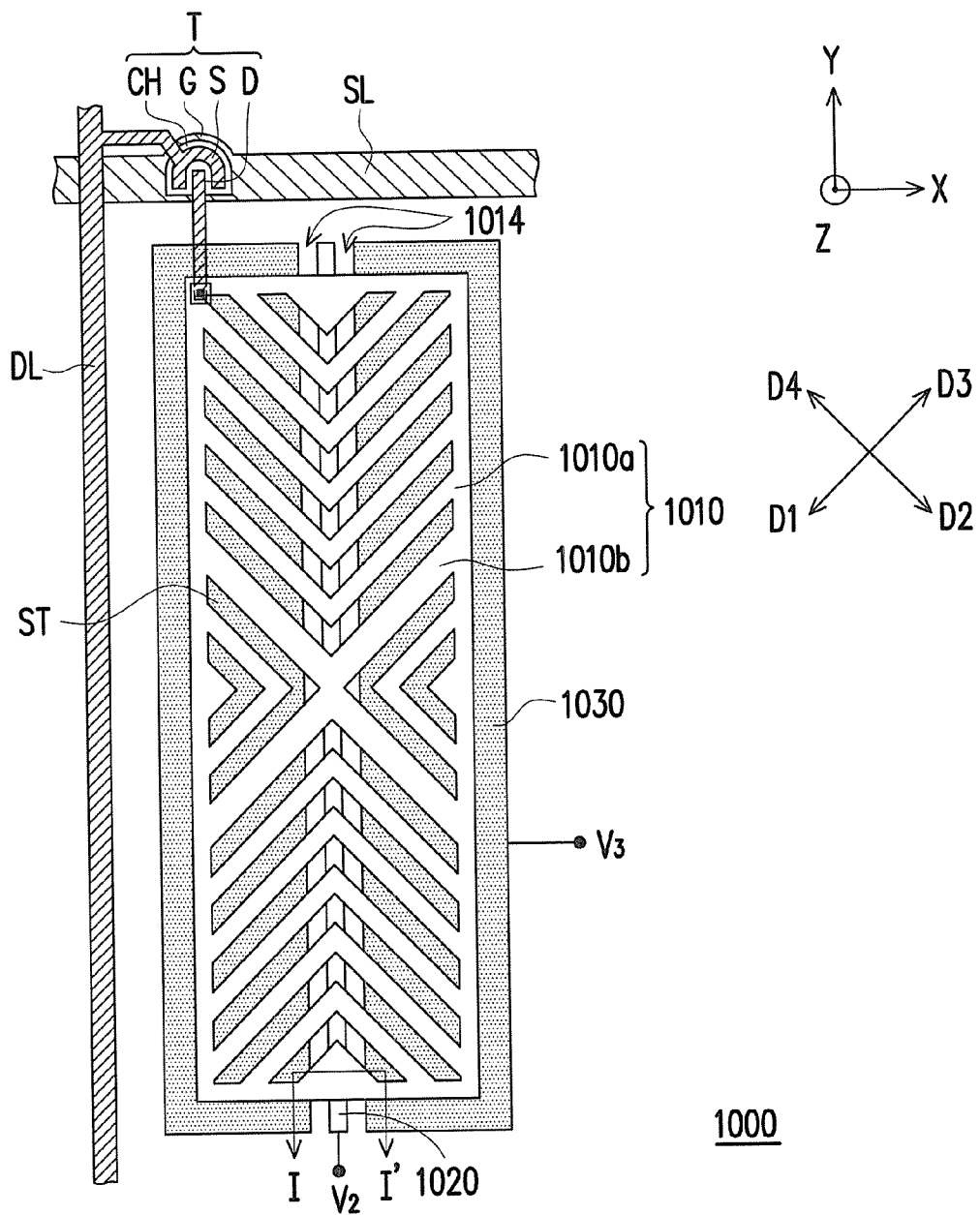
FIG. 11A is a top-view diagram of a pixel structure according to the tenth embodiment of the invention.
Figure 11B:
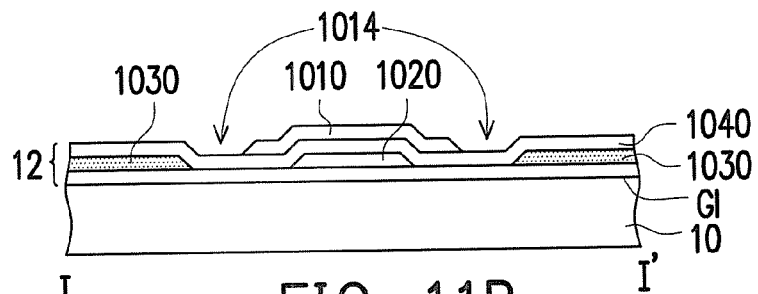
FIG. 11B is a cross-sectional diagram along line I-I' of FIG. 11A.

FIG. 11A is a top-view diagram of a pixel structure according to the tenth embodiment of the invention FIG. 11B is a cross-sectional diagram along line I-I' of FIG. 11A. The embodiment of FIGS. 11A and 11B is similar to the first embodiment of FIGS. 2A and 2B, and the same notations represent the same or similar components are adopted, while the repeated same details are omitted, which can refer to the previous embodiment. In the embodiment as shown by FIG. 11A, the enclosed box-shaped portion 1010*a* has flat outer edges, and the counter electrode 1020 has bar shape and is deposed corresponding to the center of the pixel electrode 1010 (i.e., the tips of the V-shaped branches 1010*b*). In the embodiment, the common electrode 1030 is disposed at both sides of the counter electrode 1020 and there is a gap 1014 located between the both sides of the counter electrode 1020 and the common electrode 1030. As shown by FIG. 11B, in the embodiment, the counter electrode 1020 and the common electrode 1030 are located at a same film layer, and the insulating layer 1040 is located between the pixel electrode 1010 and the film layer.

Figure 12A:
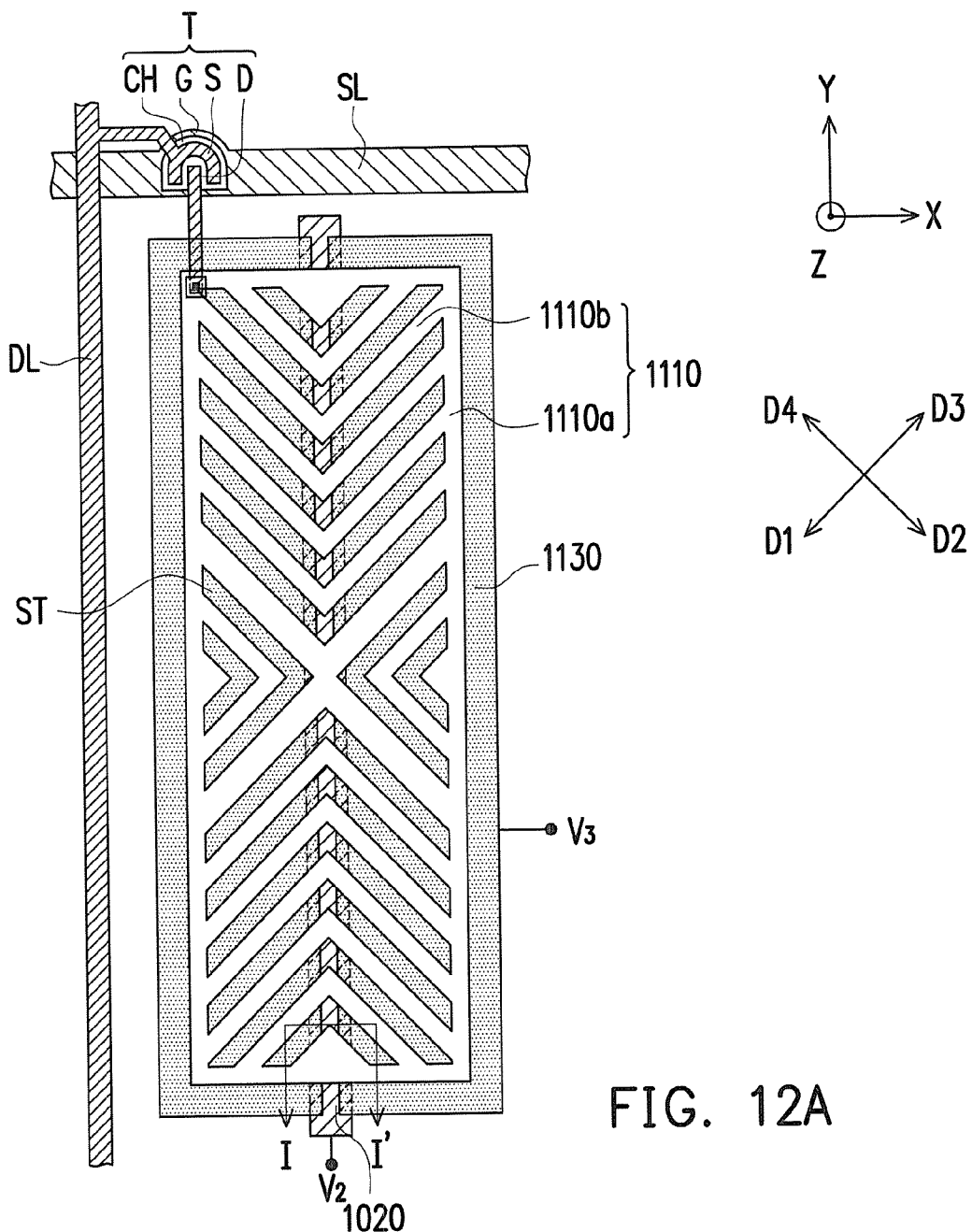
FIG. 12A is a top-view diagram of a pixel structure according to the eleventh embodiment of the invention.
Figure 12B:
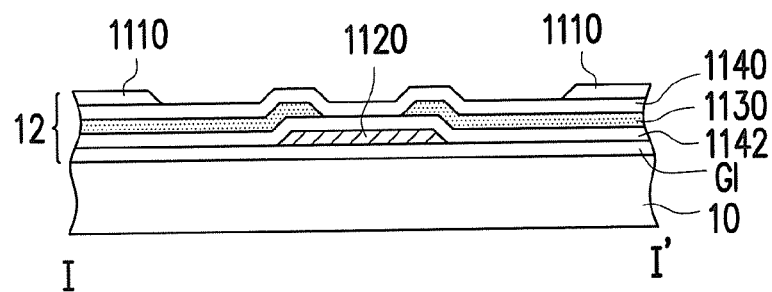
FIG. 12B is a cross-sectional diagram along line I-I' of FIG. 12A.

FIG. 12A is a top-view diagram of a pixel structure according to the eleventh embodiment of the invention and FIG. 12B is a cross-sectional diagram along line I-I' of FIG. 12A. The embodiment of FIGS. 12A and 12B is similar to the first embodiment of FIGS. 2A and 2B, and the same notations represent the same or similar components are adopted, while the repeated same details are omitted, which can refer to the previous embodiment. In the embodiment as shown by FIG. 12A, the enclosed box-shaped portion 1110*a* has flat outer edges and the widths of a plurality of V-shaped branches 1110*b* are the same as each other. In the embodiment, as shown by FIG. 12B, the pixel electrode 1110, the counter electrode 1120 and the common electrode 1130 are located at different film layers, and there is an insulating layer respectively disposed between the three film layers (the insulating layer 1140 and the insulating layer 1142 in FIG. 12B). In the embodiment, the counter electrode 1120 is composed of a conductive layer; for example, the conductive layer is a second metal layer M2 (i.e., located at the same film layer as the source S and the drain D). The counter electrode 1120 has bar shape and is located corresponding to the center of the pixel electrode 1110 (i.e., the tips of the V-shaped branches 1110*b*). In the embodiment, the common electrode 1130 is disposed at both sides of the counter electrode 1120 and is partially overlapped with the both sides of the counter electrode 1120.

Figure 13A:
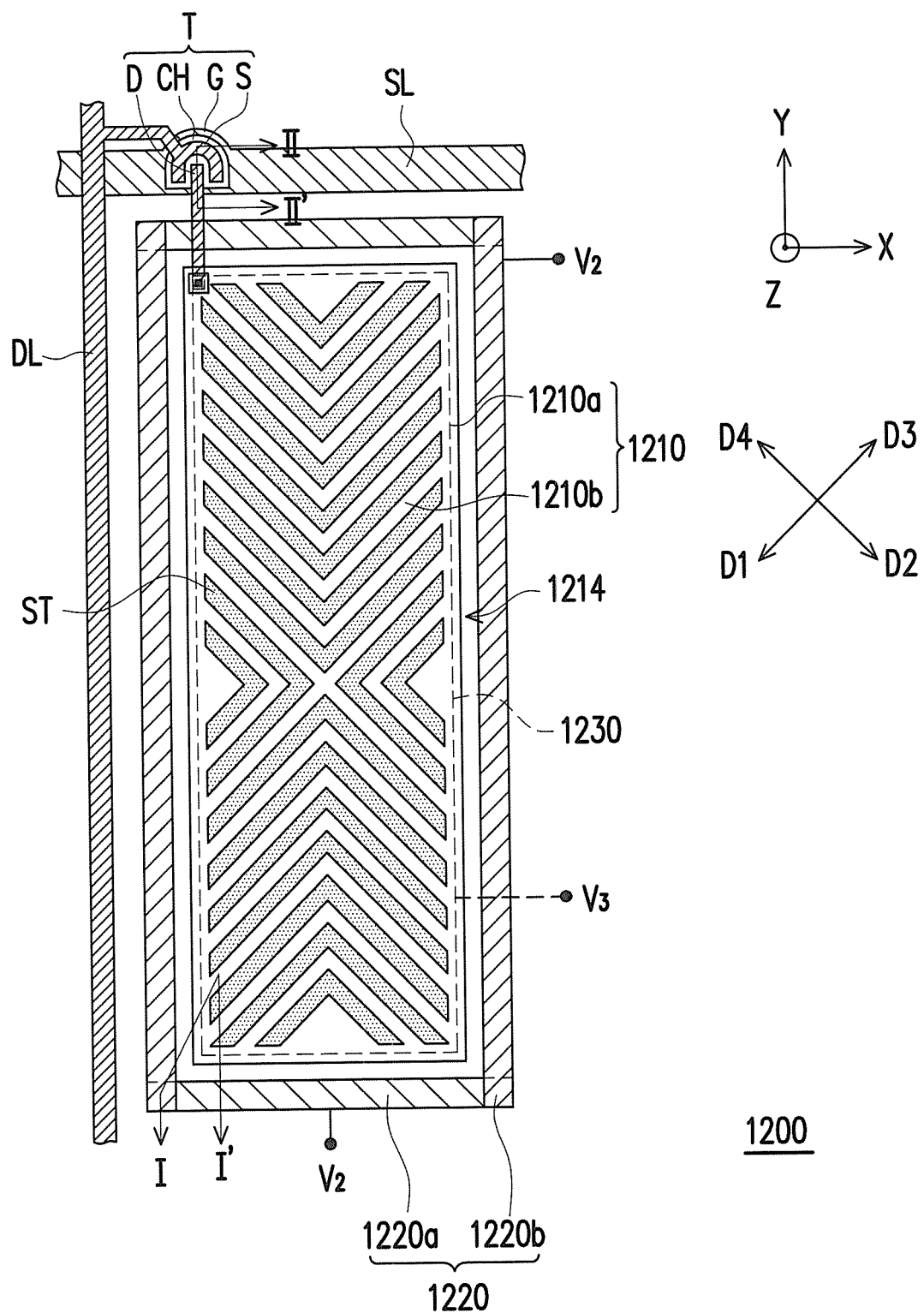
FIG. 13A is a top-view diagram of a pixel structure according to the twelfth embodiment of the invention.
Figure 13B:
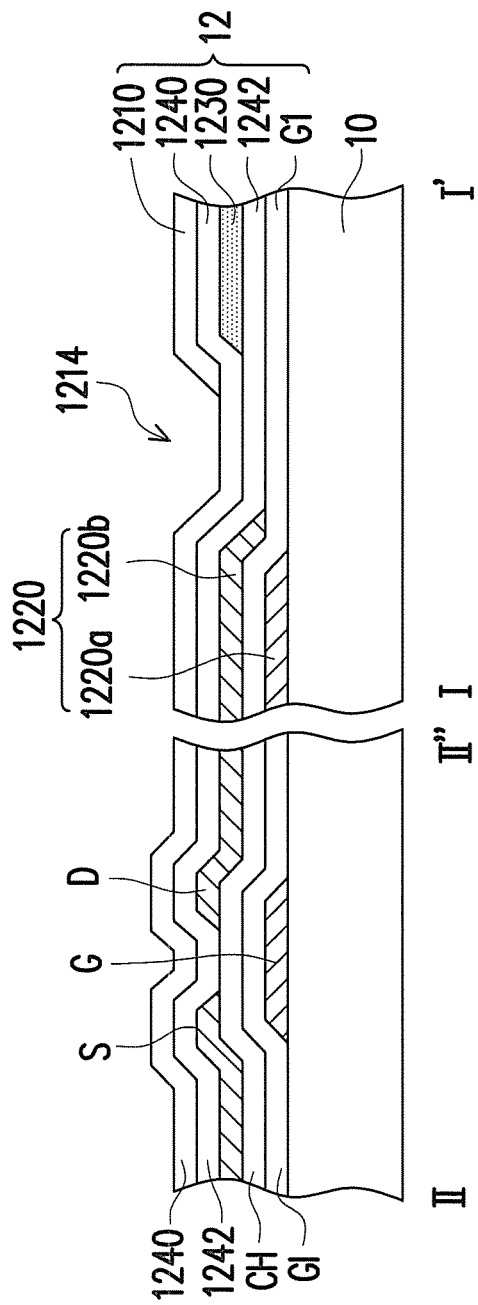
FIG. 13B is a cross-sectional diagram along line I-I' of FIG. 13A.

FIG. 13A is a top-view diagram of a pixel structure according to the twelfth embodiment of the invention and FIG. 13B is a cross-sectional diagram along line I-I' of FIG. 13A. The embodiment of FIGS. 13A and 13B is similar to the first embodiment of FIGS. 2A and 2B, and the same notations represent the same or similar components are adopted, while the repeated same details are omitted, which can refer to the previous embodiment. In the embodiment as shown by FIG. 13A, the enclosed box-shaped portion 1210*a* has flat outer edges and the widths of a plurality of V-shaped branches 1210*b* are the same as each other. In the embodiment, as shown by FIG. 13B, the counter electrode 1220 is composed of a plurality of conductive layers; for example, the conductive layers are a first metal layer M1 (i.e., located at the same film layer as the gate G) and a second metal layer M2 (i.e., located at the same film layer as the source S and the drain D). Under the layout that the counter electrode 1220 includes a lower counter electrode 1220*a* composed of the first metal layer M1 and an upper opposite electrode 1220*b* composed of the second metal layer M2, the pixel electrode 1210, the lower counter electrode 1220*a*, the upper opposite electrode 1220*b* and the common electrode 1230 are located respectively at four different film layers. There is a gate insulating layer GI between the lower counter electrode 1220*a* and the upper opposite electrode 1220*b*, and the insulating layer 1242 and the insulating layer 1240 are respectively between the upper opposite electrode 1220*b* and the common electrode 1230 and between the common electrode 1230 and the pixel electrode 1210. In the embodiment, the lower counter electrode 1220*a* and the upper opposite electrode 1220*b* have bar shapes and are disposed symmetrically around the pixel electrode 1210 respectively on the X direction and on the Y direction. There is a gap 1214 respectively between the lower counter electrode 1220*a* and the pixel electrode 1210 and between the upper opposite electrode 1220*b* and the pixel electrode 1210. The common electrode 1230 does not extend into the gap 1214, i.e., the pixel electrode 1210 is overlapped with the common electrode 1230, both the lower counter electrode 1220*a* and the upper opposite electrode 1220*b* are not overlapped with the pixel electrode 1210, and are not overlapped with the common electrode 1230 either.

Figure 14A:
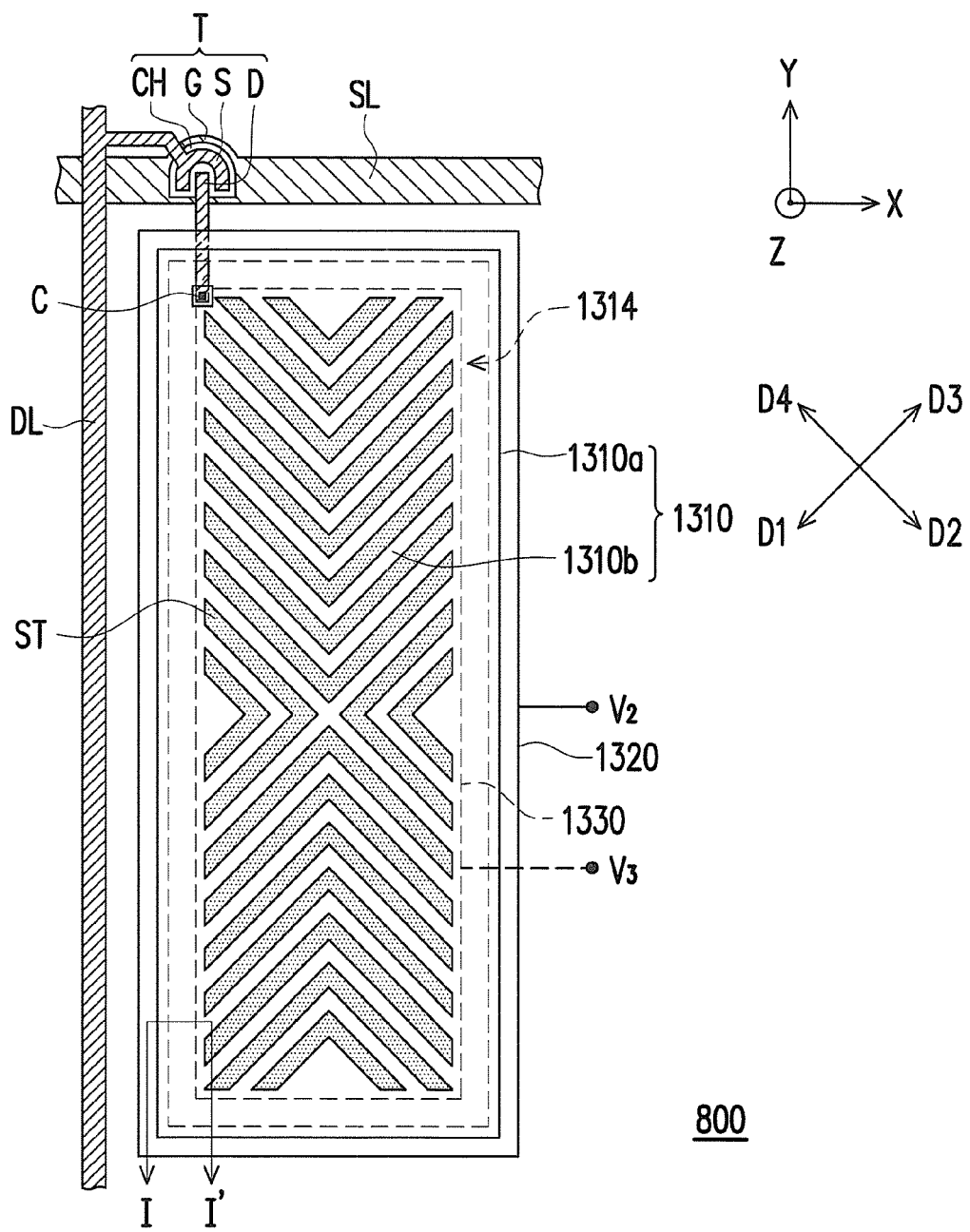
FIG. 14A is a top-view diagram of a pixel structure according to the thirteenth embodiment of the invention.
Figure 14B:
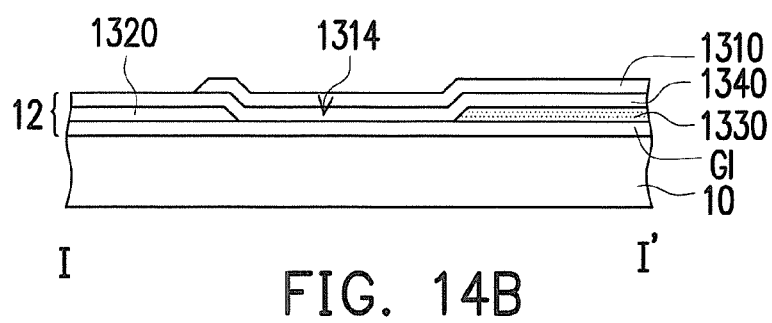
FIG. 14B is a cross-sectional diagram along line I-I' of FIG. 14A.

FIG. 14A is a top-view diagram of a pixel structure according to the thirteenth embodiment of the invention and FIG. 14B is a cross-sectional diagram along line I-I' of FIG. 14A. The embodiment of FIGS. 14A and 14B is similar to the first embodiment of FIGS. 2A and 2B, and the same notations represent the same or similar components are adopted, while the repeated same details are omitted, which can refer to the previous embodiment. As shown by FIG. 14A, a pixel electrode 1310 includes an enclosed box-shaped portion 1310*a* and a plurality of V-shaped branches 1310*b*. The pixel electrode 1310 is similar to the pixel electrode 810 so as to be omitted. In addition as shown by FIG. 14B, the counter electrode 1320 and the common electrode 1330 are located at a same film layer, and the insulating layer 1340 is disposed between the pixel electrode 1310 and the film layer. In the embodiment, the counter electrode 1320 has ring shape and surrounds the pixel electrode 1310. In addition, the distribution region of the pixel electrode 1310 is greater than the distribution regions of the common electrode 1330. In other words, the pixel electrode 1310 is overlapped with the common electrode 1330 and the counter electrode 1320. Moreover, there is a gap 1314 between the counter electrode 1320 and the common electrode 1330, and the pixel electrode 1310 is overlapped with the gap 1314.

Figure 15A:
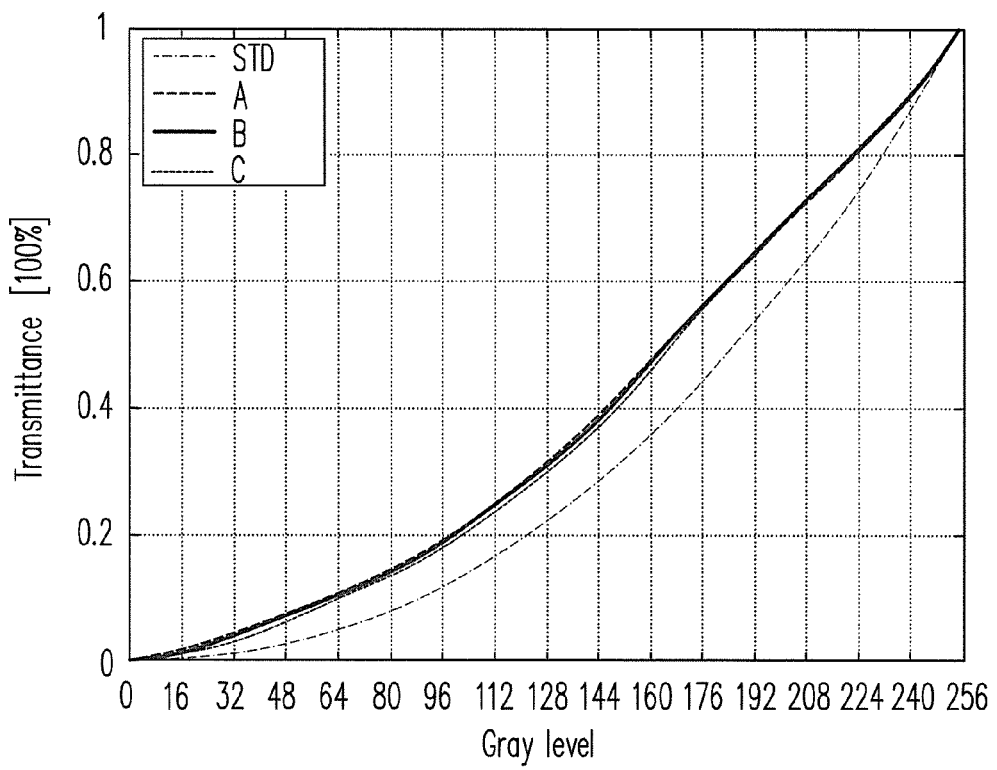
FIGS. 15A and 15B are two graphs of gamma curve of transmittance vs. gray level according to some embodiments of the invention.
Figure 15B:
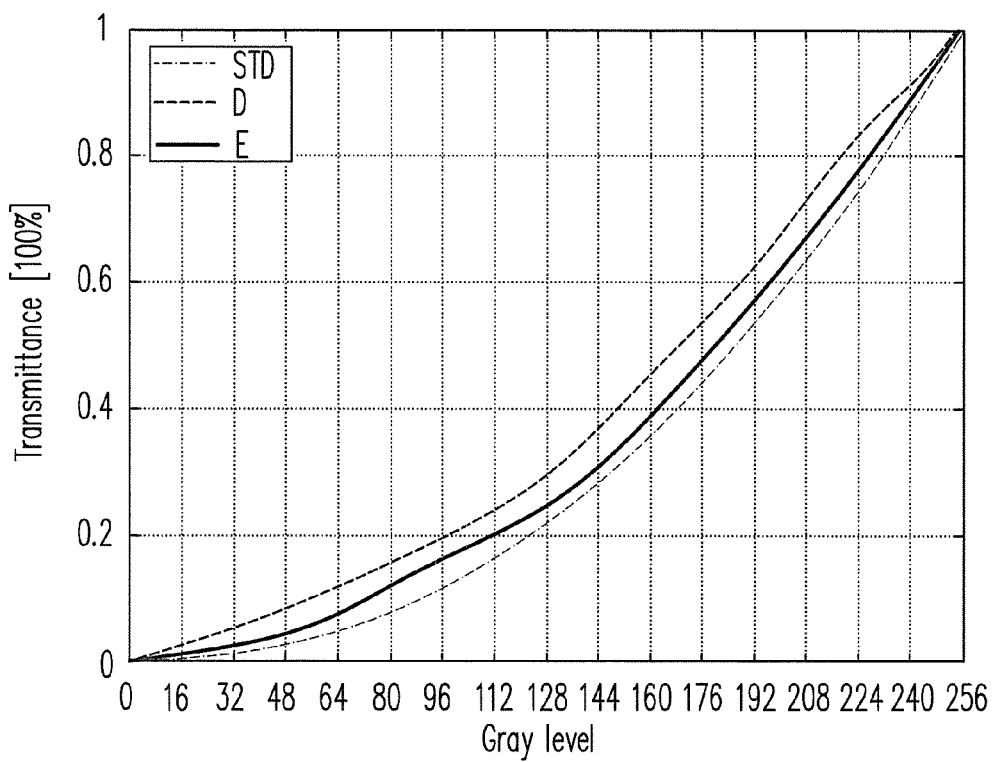

FIGS. 15A and 15B are two graphs of gamma curve of transmittance vs. gray level according to some embodiments of the invention, in which X axis represents gray level, Y axis represents transmittance and curve STD represents a standard gamma curve such as a gamma 2.2 curve. Referring to FIGS. 14A and 5A-7A, the curves A, B and C are respectively corresponding to the gamma curves of the display panels in the fourth, the fifth and the sixth embodiments. The only one difference between the embodiments rests in the distribution region of the common electrode. In the fourth embodiment (as shown by FIG. 5A), the distribution region of the common electrode 430 is greater than the distribution region of the pixel electrode 410 and the distribution region of the counter electrode 420; in the fifth embodiment (as shown by FIG. 6A), the distribution region of the common electrode 530 is greater than the distribution region of the pixel electrode 510 but less than the distribution region of the counter electrode 520; in the sixth embodiment (as shown by FIG. 7A), the distribution region of the common electrode 630 is less than the distribution region of the pixel electrode 610 and the distribution region of the counter electrode 620. Similarly, referring to FIGS. 14B and 2A-3A, the curve D and the curve E are respectively corresponding to the gamma curves of the display panels in the first and the second embodiments. In the first embodiment (as shown by FIG. 2A), the distribution region of the common electrode 130 is less than the distribution region of the pixel electrode 110 and the distribution region of the counter electrode 120; in the second embodiment (as shown by FIG. 3A), the distribution region of the common electrode 230 is greater than the distribution region of the pixel electrode 210 but less than the distribution region of the counter electrode 220. It can be seen from FIGS. 15A and 15B that the distribution of the common electrode does not affect the gamma curve. In other words, the display panel of the invention can be designed by selecting an appropriate distribution region of the common electrode depending on the requirement.

In summary, in the display panel 2000 of the invention, the pixel structure has three kinds of electrodes: a pixel electrode, a common electrode and a counter electrode. The counter electrode is electrically insulated from the pixel electrode and the common electrode, and the counter electrode is symmetrically disposed around the pixel electrode. In addition, the absolute value of the voltage $V_2$ of the counter electrode is greater than the absolute value of the voltage $V_1$ of the pixel electrode, which can ensure the inclination direction of the liquid crystal molecules over the V-shaped branches of the pixel electrode is the same as the inclination direction of the liquid crystal molecules over the V-shaped alignment slits and ensure the liquid crystal molecules sequentially incline in the inclination direction 150 of the liquid crystal molecules and further makes the display panel 2000 unlikely produce the black fringe phenomena. In more details, in the invention, the liquid crystal molecules not only respectively incline in multiple directions D1-D4 on the XY plane, but also in each of the alignment regions, the inclination direction of the liquid crystal molecules over the V-shaped branches is the same as the inclination direction of the liquid crystal molecules over the V-shaped alignment slits ST. As a result, the invention can enhance the multi-domain alignment effect so as to further reduce the color washout phenomena of the display panel under large AOV and advance the display quality of the display panel 2000.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A display panel, comprising a first substrate, a plurality of pixel structures located on the first substrate, a second substrate and a display medium located between the first substrate and the second substrate, wherein each of the pixel structures comprises:
    a scan line and a data line;
    an active device, electrically connected to the scan line and the data line;
    a pixel electrode, electrically connected to the active device;
    a common electrode, electrically insulated from the pixel electrode;
    an insulating layer, located between the pixel electrode and the common electrode; and
    a counter electrode, electrically insulated from the pixel electrode and the common electrode, wherein the counter electrode is disposed symmetrically around the pixel electrode, and an absolute value of voltage of the counter electrode is greater than an absolute value of voltage of the pixel electrode.

2. The display panel as claimed in claim 1, wherein the counter electrode and the common electrode are located at a same film layer, and the insulating layer is located between the common electrode and the film layer.

3. The display panel as claimed in claim 1, wherein the counter electrode and the common electrode are located at a same film layer, and the insulating layer is located between the pixel electrode and the film layer.

4. The display panel as claimed in claim 1, wherein the counter electrode is disposed surrounding the pixel electrode or at both sides of the pixel electrode.

5. The display panel as claimed in claim 4, wherein the pixel electrode is overlapped with the common electrode, the counter electrode is not overlapped with both the pixel electrode and the common electrode.

6. The display panel as claimed in claim 5, wherein there is a gap between the counter electrode and the pixel electrode, and the common electrode does not extend into the gap.

7. The display panel as claimed in claim 6, wherein the difference between the phase of the counter electrode and the phase of the pixel electrode is substantially 0° or 180°.

8. The display panel as claimed in claim 6, wherein the display medium is vertical alignment type liquid crystal and is negative type liquid crystal.

9. The display panel as claimed in claim 4, wherein the pixel electrode is overlapped with both the common electrode and the counter electrode.

10. The display panel as claimed in claim 9, wherein there is a gap between the common electrode and the counter electrode and the pixel electrode is overlapped with the gap.

11. The display panel as claimed in claim 4, wherein the pixel electrode is overlapped with the common electrode, and the counter electrode is overlapped with the common electrode.

12. The display panel as claimed in claim 11, wherein there is a gap between the counter electrode and the pixel electrode, and the common electrode extends into the gap.

13. The display panel as claimed in claim 12, wherein the difference between the phase of the counter electrode and the phase of the pixel electrode is substantially 0° or 180°.

14. The display panel as claimed in claim 12, wherein the display medium is vertical alignment type liquid crystal and is negative type liquid crystal.

15. The display panel as claimed in claim 1, wherein the counter electrode is disposed corresponding to a center position of the pixel electrode, and the common electrode is located at both sides of the counter electrode.

16. The display panel as claimed in claim 15, wherein the common electrode and the counter electrode are located at a same film layer, and the insulating layer is located between the pixel electrode and the film layer.

17. The display panel as claimed in claim 15, wherein the common electrode, the counter electrode and the pixel electrode are located at different film layers.

18. The display panel as claimed in claim 1, wherein the counter electrode is composed of a plurality of conductive layers.

19. The display panel as claimed in claim 1, wherein the difference between the phase of the counter electrode and the phase of the pixel electrode is fixed and substantially 0° or 180°.

20. The display panel as claimed in claim 1, wherein the display medium is vertical alignment type liquid crystal and is negative type liquid crystal.

* * * * *